United States Patent
Hayes et al.

(10) Patent No.: US 7,228,672 B2
(45) Date of Patent: Jun. 12, 2007

(54) FIBER ARCHITECTURE FOR A COMPOSITE POLE

(75) Inventors: David C. Hayes, Las Vegas, NV (US); Daniel J. Lonergan, Phoenix, AZ (US)

(73) Assignee: Powertrusion International, Inc., Tucson, AZ (US)

( * ) Notice: Subject to any disclaimer, the term of this patent is extended or adjusted under 35 U.S.C. 154(b) by 359 days.

(21) Appl. No.: 10/418,703

(22) Filed: Apr. 18, 2003

(65) Prior Publication Data

US 2003/0196391 A1    Oct. 23, 2003

Related U.S. Application Data

(60) Provisional application No. 60/373,979, filed on Apr. 19, 2002.

(51) Int. Cl.
   *E04C 3/30*    (2006.01)
(52) U.S. Cl. .................. 52/726.4; 52/726.2; 52/731.4; 52/736.1; 52/737.1
(58) Field of Classification Search .................. 52/722, 52/723, 725, 309.17, 245, 248, 309.9, 726.4, 52/731.1, 736.1, 736.3, 309.1, 137; 264/171.23, 264/137
   See application file for complete search history.

(56) References Cited

U.S. PATENT DOCUMENTS

| 666,146 A | * | 1/1901 | Lanz | .......................... 52/732.3 |
| 2,870,793 A | * | 1/1959 | Bailey | ........................ 138/141 |
| 3,177,667 A | | 4/1965 | Liddell | |
| 3,378,978 A | | 4/1968 | Durand | |
| 3,429,758 A | * | 2/1969 | Young | .......................... 156/79 |
| 3,562,403 A | * | 2/1971 | Monahan et al. | ......... 174/45 R |
| 3,570,376 A | * | 3/1971 | Overton et al. | ................ 52/38 |
| 3,574,104 A | * | 4/1971 | Medlar | ........................ 428/222 |
| 3,813,837 A | * | 6/1974 | McClain et al. | ........... 52/309.1 |
| 4,155,970 A | * | 5/1979 | Cassell | ....................... 264/137 |
| 4,312,162 A | * | 1/1982 | Medney | ................... 52/309.16 |
| 4,751,804 A | * | 6/1988 | Cazaly | ...................... 52/721.2 |
| 4,803,819 A | * | 2/1989 | Kelsey | ....................... 52/309.1 |
| 5,043,033 A | * | 8/1991 | Fyfe | ............................ 156/71 |

(Continued)

OTHER PUBLICATIONS

Applicants prior art, figures 3 and 9 within the drawings.*

(Continued)

*Primary Examiner*—Yvonne M. Horten
*Assistant Examiner*—Chi Q. Nguyen
(74) *Attorney, Agent, or Firm*—Quarles & Brady LLP (57) ABSTRACT

A fiber architecture in the form of an elongate beam having a hollow polygonal cross section with a plurality of substantially flat exterior sides and a corner between each pair of adjacent exterior sides. The cross section is substantially thicker adjacent each corner. The fiber architecture includes a first fabric layer extending around the beam, a layer of circumferential longitudinal rovings extending around the beam adjacent the outside of the first fabric layer, corner longitudinal rovings coterminous and integral with the outside of the circumferential rovings adjacent each corner, and a second fabric layer extending around the beam adjacent the outside of the corner rovings and adjacent the outside of the circumferential rovings not covered by corner rovings. The fabric architecture may be impregnated with resin to form a composite pole that may be used as a utility pole.

34 Claims, 5 Drawing Sheets

U.S. PATENT DOCUMENTS 5,218,810 A * 6/1993 Isley, Jr. .................... 52/723.1
5,809,734 A * 9/1998 Turner ....................... 52/736.1
5,870,877 A * 2/1999 Turner ....................... 52/736.3
6,155,017 A * 12/2000 Turner ....................... 52/726.4
6,434,906 B1 * 8/2002 Jernstrom .................. 52/726.4
6,453,635 B1 * 9/2002 Turner ....................... 52/726.4

OTHER PUBLICATIONS

Pultrusion Industry Council, Products & Process: Process Description, webpage, 2001.
Poltrusion Industry Council, Products & Process: Glossary of Pultrusion Terms, webpage, 2001.

* cited by examiner

FIBER ARCHITECTURE FOR A COMPOSITE POLE

CROSS REFERENCE TO RELATED APPLICATIONS

This non-provisional United States (U.S.) patent application claims the benefit of U.S. Provisional Application No. 60/373,979 filed on Apr. 19, 2002 by inventors David C. Hayes and Daniel J. Lonergan entitled "Composite Pole Laminate Construction." U.S. Provisional Application No. 60/373,979 is incorporated herein by reference.

BACKGROUND OF THE INVENTION

Figure 1:
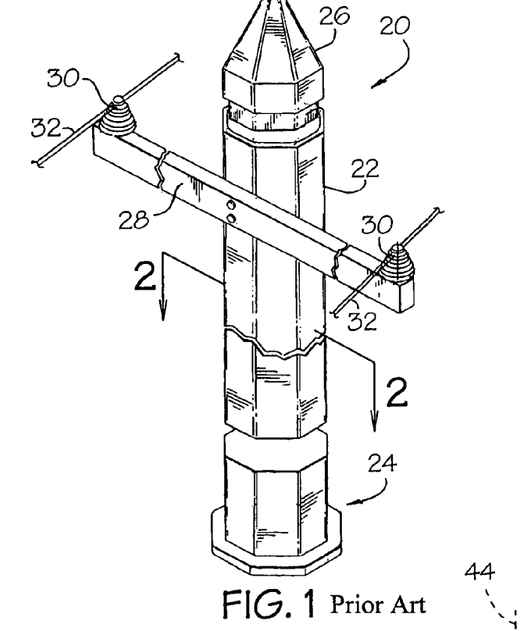
FIG. 1 is a perspective view of an exemplary utility pole that may embody the present invention.

As shown in FIG. 1, a utility pole assembly 20 may be constructed with some or all components of the pole assembly 20 made from a composite material such as a fiberglass reinforced resin. The outer surface of the composite material is typically smooth so that animals may be discouraged from climbing the pole. Such a utility pole may not carry bacteria or generate slivers that can be dangerous to maintenance and repair personnel. The composite material may be a dielectric, which may reduce the amount of current that drains to the ground. The composite pole assembly may be immune to corrosive ambient conditions. The composite pole may be an alternative to wood utility poles that may require treatment with toxic chemicals to provide resistance to insects and fungi.

The pole assembly 20 illustrated in FIG. 1 includes a main pole member 22, a base member 24, and a top cap 26, shown in an exploded view so the parts are easily seen. Also shown is an exemplary cross arm 28 with insulators 30 supporting power lines 32. Of course the base and/or top cap may be of other configurations as desired.

Figure 2:
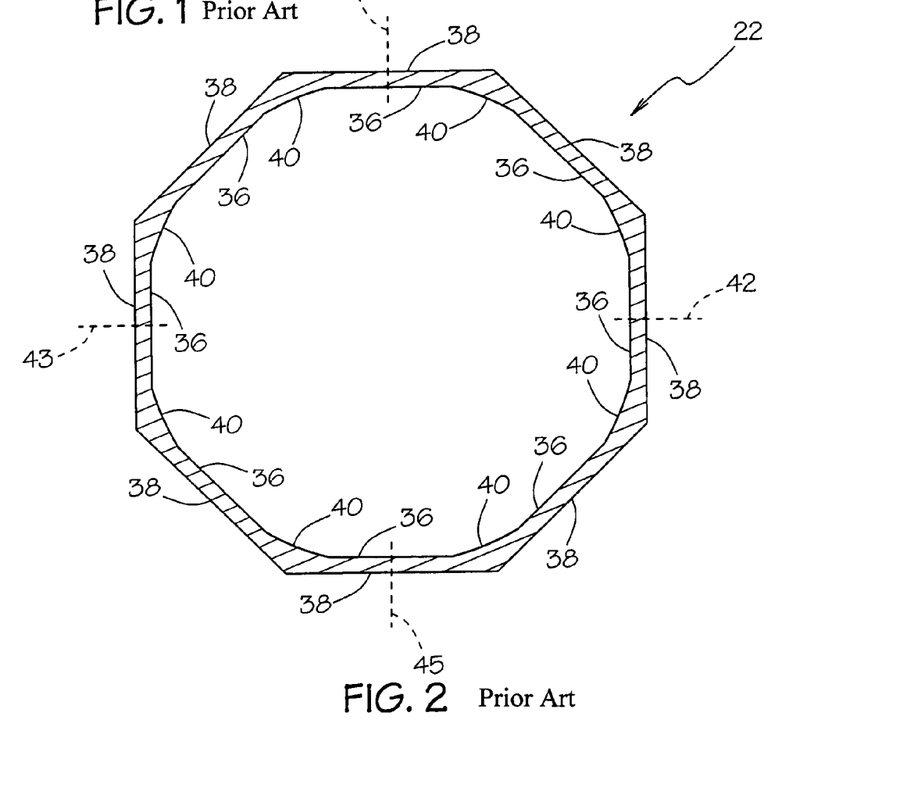
FIG. 2 is a generalized cross section taken along line 2-2 of FIG. 1.

Referring to FIG. 2, a generalized cross section of the main pole member 22 taken along line 2-2 of FIG. 1 may be seen. The cross section as shown in FIG. 2 is characterized as a hollow section formed by various geometric shapes, generally polygons. The outer periphery of the exemplary pole is octagonal, that is, the pole has eight substantially flat exterior surfaces. The eight sides of the external surface of the pole is a convenient number of sides, as it allows mounting of cross arms in a manner orthogonal to each other as well as at 45 degrees, which may accommodate requirements normally found in practice. A lesser or greater number of sides for the outer periphery of the pole may also be used if desired. Poles of lesser or greater numbers of sides may be fabricated in accordance with the present invention, though poles with not less than 6 sides or no more than 12 sides are preferred, poles with 8 sides being most preferable for fabrication, structural and other reasons. The sides may be of equal or unequal lengths. The angles between the sides may be identical or they may vary.

The internal periphery of the exemplary pole member 22 as shown in FIG. 2 may be defined by a plurality of flat regions 36 parallel to the flat sides 38 on the outer periphery of the pole, with the flat sides 36 being joined by circular arcs 40 tangent to adjacent flat regions 36 as disclosed in U.S. Pat. No. 6,453,635, which is assigned to the same owner as the present application. This internal periphery is referred to as a circular-tangere shaped inner channel. Circular-tangere shaped inner channels may be used with poles having other numbers of sides.

The pole may be formed by a pultrusion process using a fiber architecture of high strength filament thoroughly impregnated with a resin compressed and heated to form all or part of the pole structure. The filaments in the fiber architecture may be organized with orientations chosen to provide the desired mechanical properties for the finished pole. The filaments may be provided in various forms such as rovings that arrange all the filaments substantially parallel to each other along the length of the roving and fabrics that arrange the filaments at substantial angles to one another. Rovings are generally cordlike or ropelike arrangements of filaments. The term fabric includes mats in which the filaments are arrange randomly and stitched fabrics in which layers of filaments are joined together by stitching as well as woven and knitted fabrics. The rovings and fabrics may be arranged in layers to produce the fiber architecture for the desired pole structure.

Figures 3, 4:
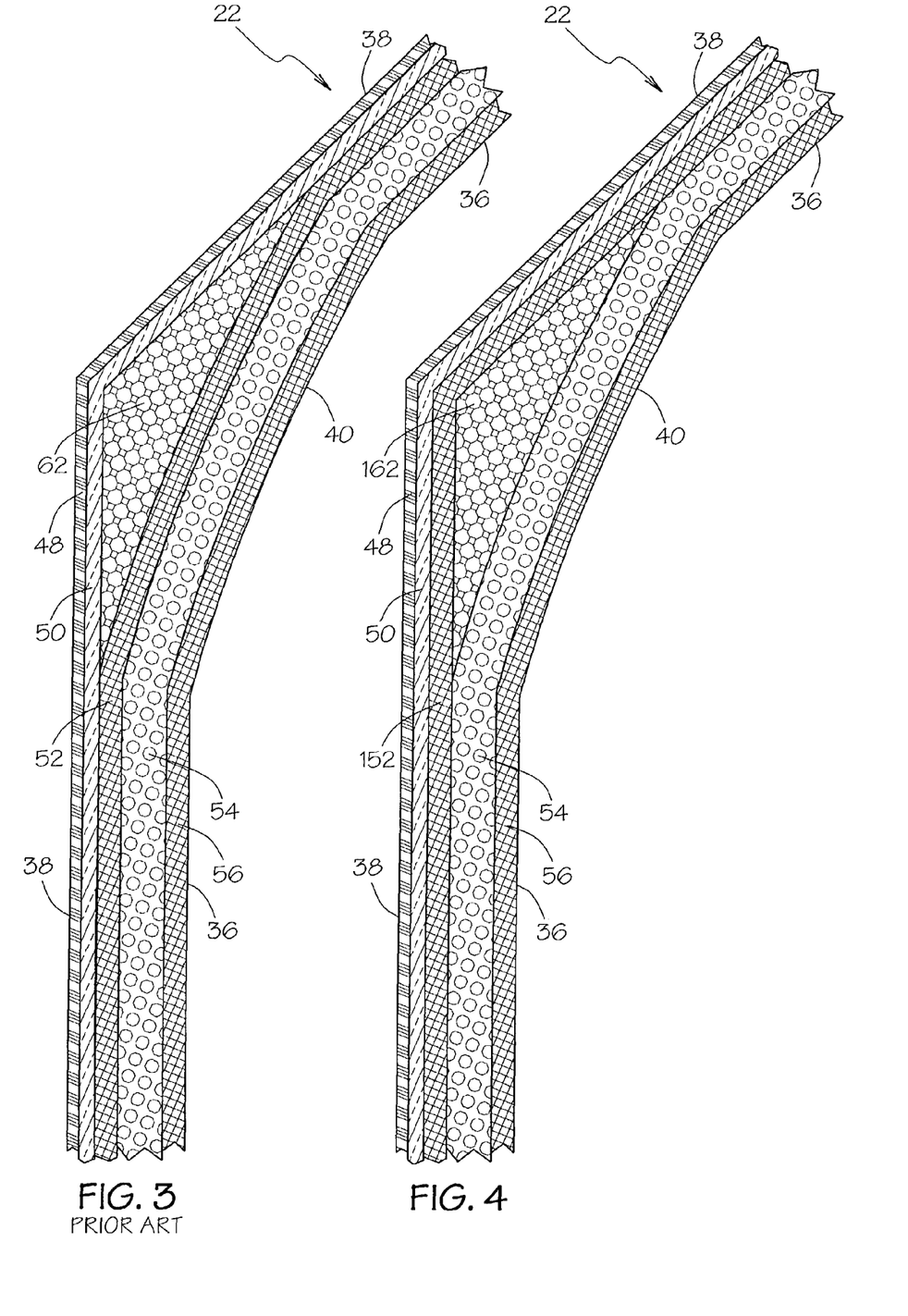
FIG. 3 is a detail of a corner portion of a cross section of a prior art fiber architecture that may be used in a utility pole.
FIG. 4 is a detail of a corner portion of a cross section of a fiber architecture that embodies the present invention.

FIG. 3 is a detailed cross-section of a corner portion of the generalized cross section shown in FIG. 2 for a prior art fiber architecture comprised of a number of layers. The layers comprise a surfacing veil 50, corner regions of longitudinal rovings 62, a fabric layer 52, a circumferential layer of longitudinal rovings 54, and another fabric layer 56 for the interior layer of the pole. The layers of the fiber architecture may be brought together in the desired arrangement by guides at the entrance of a pultrusion machine. The filaments of the fiber architecture may be thoroughly impregnated with a resin to bind the filaments together to produce a composite pole 22. As may be seen in FIG. 3, the corner regions of longitudinal rovings 62 are corner regions only, and form no part of the various layers in the flat regions between the corner regions of the fiber architecture.

The fabric regions 52, 56 may comprise fabric sheets that each individually circumscribe approximately one-half of the pole, two side by side sheets being used for each circumferential layer. Accordingly, each of the two fabric layers 52, 56 may have some form of discontinuity 180° apart. These discontinuities have been found to reduce the strength of the pole in bending about certain axes.

Figure 9:
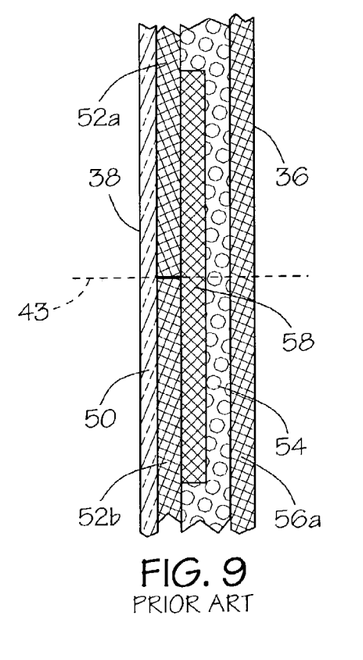
FIG. 9 is a detail of a first side portion of a cross section of a prior art fiber architecture that may be used in a utility pole.
Figure 11:
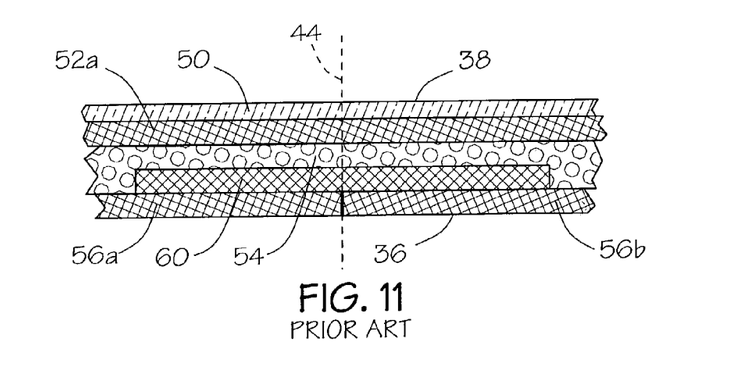
FIG. 11 is a detail of a second side portion of a cross section of a prior art fiber architecture.

In a prior art fabric architecture, the cross-section may be formed as shown in FIG. 9, with an additional fabric strip 58 bridging the butt joint of the fabric sheets 52a, 52b that form the outer layer of fabric. The bridging fabric strip 58 may displace the adjacent roving 54 as suggested by FIG. 9, a bulge (not shown) may be created on the inner surface 36, or both effects may occur. In practice, the ideal joint illustrated in FIG. 9 can only be approximated. In particular, the edges of the fabric sheets 52a, 52b may overlap somewhat in some portions of the fabric architecture, which together with the fabric strip 58 immediately thereabove causes an unintended thickness of fabric in that area. Worse yet, in some regions of the fabric architecture there may in fact be a space between the edges of the fabric sheets 52a, 52b. This creates an even greater local weakness in the pole formed from the fabric architecture. FIG. 11 illustrates a similar intended butt joint in the inner layer of the fabric 56, specifically by way of a strip of fabric 60 adjacent to the butt joint of fabric sheets 56a, 56b that form the inner layer. This joint also is subject to the imperfections hereinbefore referred to, resulting in the reduction in the bending strength of the formed pole.

SUMMARY OF THE INVENTION

A fiber architecture in the form of an elongate beam having a hollow polygonal cross section with a plurality of substantially flat exterior sides and a corner between each pair of adjacent exterior sides. The cross section is substantially thicker adjacent each corner. The fiber architecture includes a first fabric layer extending around the beam, a layer of circumferential longitudinal rovings extending around the beam adjacent the outside of the first fabric layer, corner longitudinal rovings coterminous and integral with the outside of the circumferential rovings adjacent each corner, and a second fabric layer extending around the beam adjacent the outside of the corner rovings and adjacent the outside of the circumferential rovings not covered by corner rovings. The fabric architecture may be impregnated with resin to form a composite pole that may be used as a utility pole.

DETAILED DESCRIPTION OF THE INVENTION

One embodiment of the present invention comprises a fiber architecture that may be used to form a utility pole in the form of an elongate composite beam having a hollow polygonal cross section and having similar layers as the prior art fiber architecture described above, but with a different arrangement of those layers. The hollow polygonal cross section has an exterior with a number of substantially flat sides and a corner between each pair of adjacent sides. The interior of the cross section is shaped such that the cross section is substantially thicker adjacent each corner. The fiber architecture provides reinforcement to resin that impregnates the fiber architecture to form a composite structure generally in the form of a hollow tube or pole.

As shown in FIG. 4, the layers of an embodiment of the inventive fiber architecture may comprise, in order from the outer surface toward the inner surface, a surfacing veil 50, a fabric layer 52, corner regions of longitudinal rovings 162, a circumferential layer of longitudinal rovings 54, and another fabric layer 56 which may be the interior layer of the pole. The layers of the fiber architecture may be brought together in the desired arrangement by guides at the entrance of a pultrusion machine. The filaments of the fiber architecture may be thoroughly impregnated with a resin to bind the filaments together to produce a composite pole 22. An ultraviolet resistant layer 48 may be sprayed on the pole. In an alternate embodiment, the resin may be chosen to be resistant to ultraviolet and, in conjunction with the surfacing veil 50, provide sufficient surface protection allowing the ultraviolet resistant layer 48 to be omitted. The resin may be a polyester, a vinyl ester, a polyurethane, or other resin suitable for binding the fiber architecture together, the resin being chosen to meet the desired characteristics for the composite pole and the requirements for the fabrication process being used which may be pultrusion or any other suitable process for creating a composite part based on the fiber architecture.

The interior of the cross section being substantially thicker adjacent each corner, accommodates the corner regions of longitudinal rovings 162. As may be seen in FIG. 4, the corner regions of longitudinal rovings 162 are corner regions only, and form no part of the various layers in the flat regions between the corner regions of the octagonal pole. In particular, as shown in FIG. 4, the outer layer of fabric 152 extends outward over the longitudinal rovings 162 in each of the corners of the pole, rather than between the longitudinal rovings 62 and the longitudinal rovings 54 as shown in the prior art of FIG. 3.

The foregoing would seem to move the corner rovings inward to possibly reduce the strength of the pole because of the more inward positioning of the corner rovings that contribute very significantly to the strength of the pole. However, the layers of fabric 152, 56, which are more important to the cylinder hoop strength and flexural strength of the pole, are relatively thin layers, so the amount the outer layer of fabric 152 displaces the longitudinal rovings 162 in the corners inward is slight. More importantly however, the new positioning of the various layers in accordance with the present invention makes the corner longitudinal rovings 162 coterminous and integral with the longitudinal rovings 54 distributed around the periphery of the pole. This fiber architecture has been found to increase the flexural strength of the pole by approximately 10%-15%, providing either a stronger pole or a reduction in the cost of materials used to obtain a designated strength.

In particular, when the prior art composite pole is loaded to failure in bending, the pole does not break like a matchstick, but rather fails like a soda straw, wherein failure in bending arises from a collapse of the circular cross-section of the pole at some point, typically the compression failure location of the maximum bending moment, after which the pole simply folds around the collapsed cross-section. In the prior art distribution of the layers shown in FIG. 3, it was found that the layer of fabric 52 between the corner longitudinal rovings 62 and the circumferential longitudinal rovings 54 facilitated a failure in shear between the bundles of longitudinal rovings 62 in the corner and the circumferential longitudinal rovings 54. Consequently, under high bending moments, the resin impregnated longitudinal roving bundles 62 that were compressively loaded would break away as a unit from the rest of the pole 22 and deflect outward from the neutral axis of the pole, after which the cross-section of the pole would collapse because of the lack of resistance to bending normally provided by the corner rovings.

In the inventive distribution of the layers exemplified by the cross-section of FIG. 4, the corner rovings 162 are integral with and integrally bonded to the circumferential layer of longitudinal rovings 54. This in essence has been found to unitize corner rovings 162 and the circumferential rovings 54 preventing the corner rovings from breaking away from the rest of the structure in bending. The net result, as stated before, has been found to be approximately a 10%-15% increase in flexural strength of the pole 22 with no change in materials used. The corner longitudinal rovings 162 and the longitudinal rovings 54 may be of the same or different materials. If the corner and the longitudinal rovings are of the same material, they may become indistinct layers in the fiber architecture. The corner and the longitudinal rovings may be introduced into the fiber architecture separately or together during fabrication.

Referring to FIG. 4 for large poles, the inner fabric layer 56 and the circumferential layer of longitudinal rovings 54 may be replicated one or more times, so that, by way of example, the cross-section proceeding outward would be a fabric layer, a layer of longitudinal rovings, another fabric layer, another layer of longitudinal rovings and then corner longitudinal rovings 162, etc. In any event, the circumferential layer of longitudinal rovings 54 adjacent the corner longitudinal rovings 162 should have a radial thickness of at least 20% of the maximum radial thickness of the corner longitudinal rovings 162, more preferably a thickness of at least 25%, and in a preferred embodiment approximately 25-30% of the maximum radial thickness of the corner longitudinal rovings 162.

Figures 5, 6:
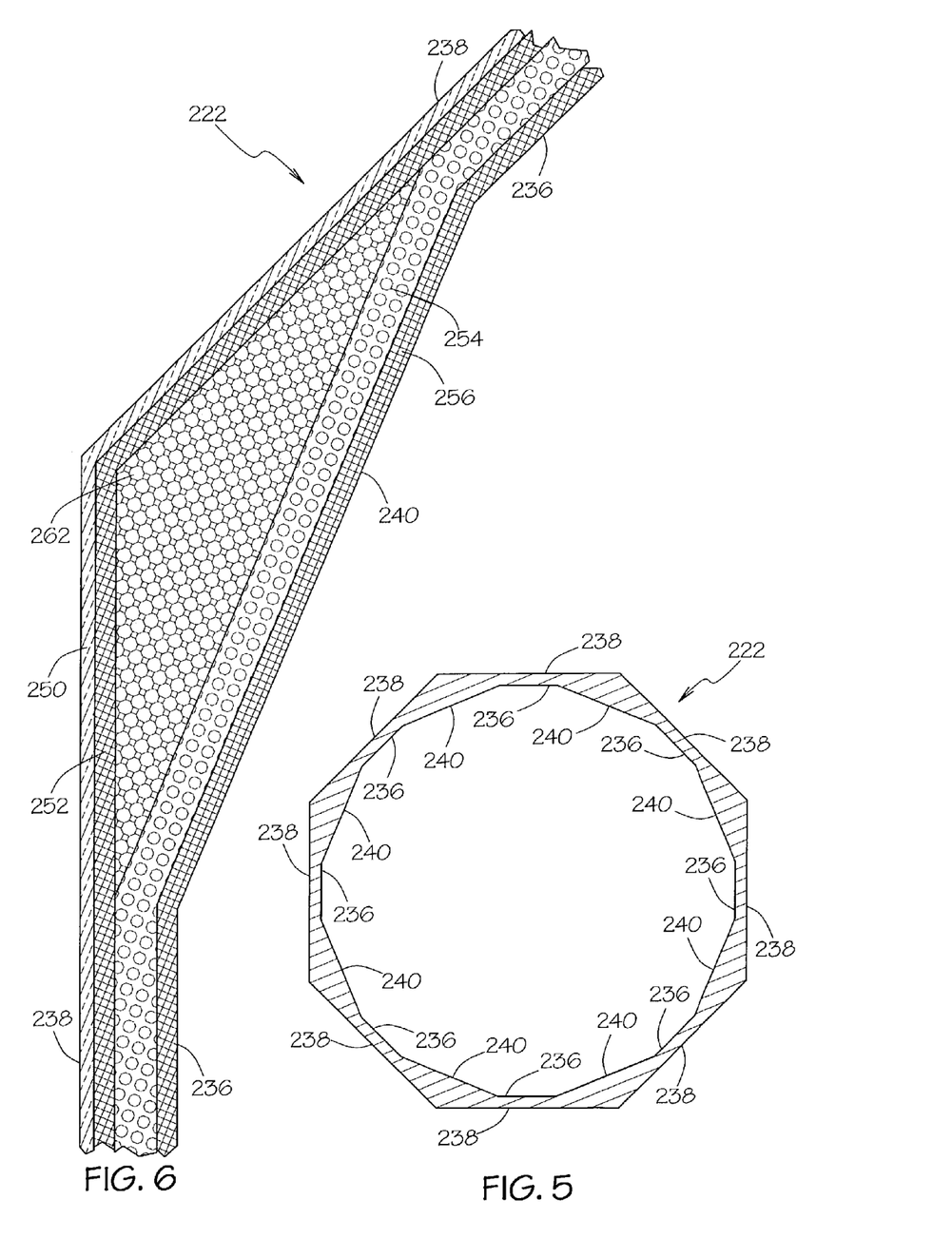
FIG. 5 is another generalized cross section taken along line 2-2 of FIG. 1.
FIG. 6 is a detail of a corner portion of another cross section of a fiber architecture that embodies the present invention.
Figures 7, 8:
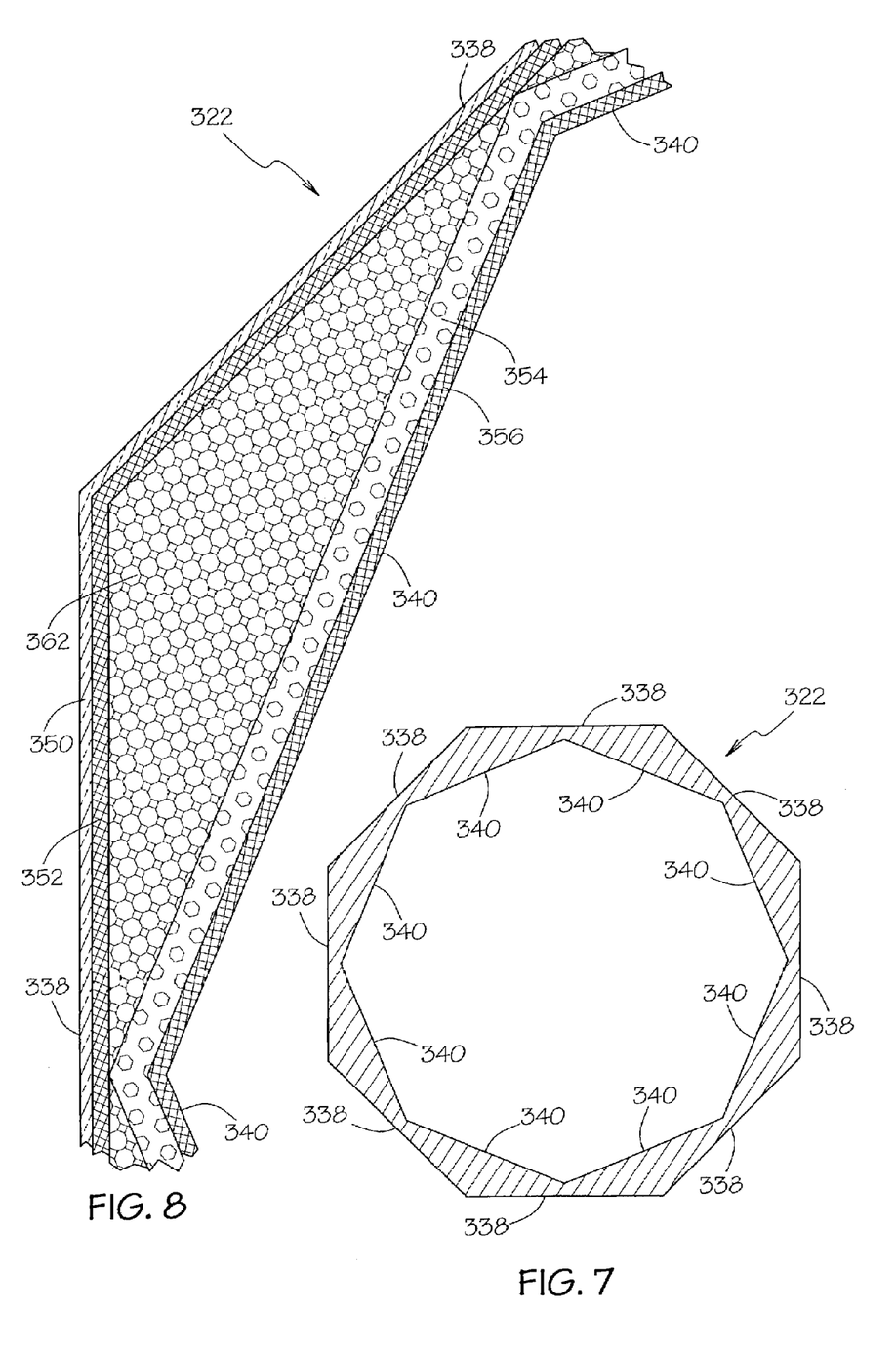
FIG. 7 is another generalized cross section taken along line 2-2 of FIG. 1.
FIG. 8 is a detail of a corner portion of another cross section of a fiber architecture that embodies the present invention.

The inclusion of corner longitudinal rovings 162 will cause the cross section of the fabric architecture to be substantially thicker adjacent each corner than in the area adjacent a midpoint of an exterior side. The interior surface of the fabric architecture may be any of a variety of shapes to accommodate the thickening adjacent each corner. FIG. 5 shows a cross section for another embodiment of a fiber architecture and FIG. 6 shows a detail of that cross section. The surfaces and layers of the embodiment shown in FIGS. 5 and 6 have been given reference numbers that correspond to reference numbers used in the embodiment shown in FIGS. 2 and 4 prefixed by 200 to allow the similarities of the embodiments to be readily observed. In this embodiment all of the interior surfaces are flat. FIG. 7 shows a cross section for another embodiment of a fiber architecture and FIG. 8 shows a detail of that cross section. The surfaces and layers of the embodiment shown in FIGS. 7 and 8 have been given reference numbers that correspond to reference numbers used in the embodiment shown in FIGS. 2 and 4 prefixed by 300 to allow the similarities of the embodiments to be readily observed. In this embodiment the interior has the same number of surfaces as the exterior.

Figure 10:
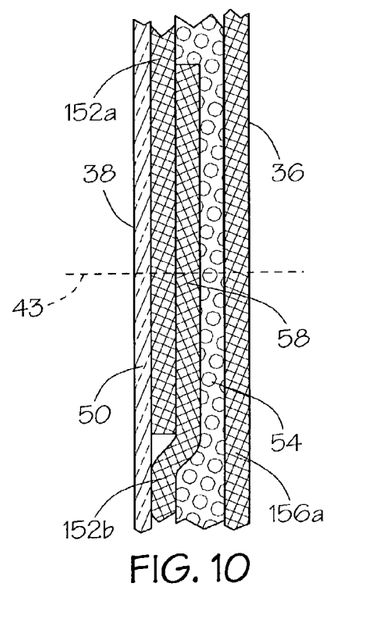
FIG. 10 is a detail of a first side portion of a cross section of a fiber architecture that embodies the present invention.

Now referring to FIG. 10, a further improvement in the fiber architecture may be seen. FIG. 10 illustrates the joint between the fabric sheets 152*a*, 152*b* that form the outer layer of fabric at the 180° position 43 of the cross-section as shown in FIG. 2. There may be a similar joint at the 0° position 42.

The sheets of the fabric 152*a*, 152*b* forming the outer fabric layer are intentionally increased in width so as to overlap at least some minimum amount, assuring that the two sheets of fabric bond together at the joint. For that purpose the overlap preferably will be at least 24 times the thickness of the fabric, more preferably at least 32 times the thickness of each fabric and may be substantially larger than 32 times if desired.

While the overlap doubles the thickness of the fabric in the region of the overlap, the fabric is normally relatively thin compared to the layer(s) of longitudinal rovings 54, and may be accommodated by displacement or compression of the rovings, a bulge (not shown) created on the outer surface 38, or both. In that regard, the overlap may avoid the possibility of a void or gap between the edges of the adjacent pieces of fabric 152*a*, 152*b*, or alternatively, having both an overlap as well as the additional thickness of a bridging fabric strip.

Figure 12:
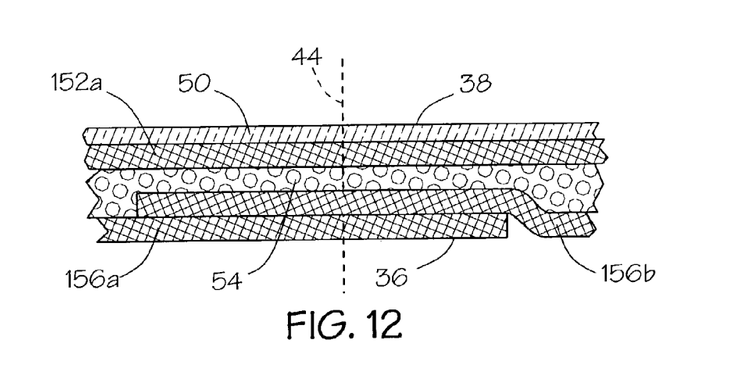
FIG. 12 is a detail of a second side portion of a cross section of a fiber architecture that embodies the present invention.

In one embodiment, a similar overlap joint is also used for the fabric sheets 156*a*, 156*b* that form the inner fabric layer as shown in FIG. 12. This overlap joint is preferably positioned at the 90° position 44 and the 270° position 45 around the pole 22 so as to be orthogonal to the overlap in the outer layer of fabric. For large poles wherein additional replicated layers of fabric and longitudinal rovings may be used, such additional layers of fabric would preferably have similar overlapping joints, preferably angularly displaced from those already described.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. The fabric architecture may be fabricated using various high strength filaments as are well known in the art, such as fiberglass, Kevlar, graphite and the like. The fabric architecture may be used with any resin that is suitable for forming a composite structure with the types of filaments used in the fabric architecture such as polyester, epoxy, polyurethane, vinyl ester and other resins. Other or different layers may be incorporated if desired, except that no fabric layer should separate corner bundles of longitudinal rovings from a circumferential layer of longitudinal rovings. While fabric architectures with eight exterior sides are frequently preferred, N sided fabric architectures may be fabricated in accordance with the present invention, where N is less than or greater than eight. Also while N normally is chosen to be an even number, this too is not a limitation of the invention. The fabric architecture is not limited to having all sides of equal length and is not limited to having the same angle between all adjacent sides. While fabric architectures having 2N interior sides are frequently preferred, the fabric architecture may have N interior sides, other numbers of interior sides, a round interior, or other curved interior shape.

What is claimed is:

1. A fiber architecture comprising an elongate beam having a hollow polygonal cross section with a plurality of substantially flat exterior sides and a corner between each pair of adjacent exterior sides, the beam including a hollow substantially polygonal interior fabric layer, a layer of circumferential longitudinal rovings extending around the beam adjacent the outside of the interior fabric layer, and an exterior fabric layer extending around the beam adjacent the outside of the circumferential rovings, the interior fabric layer further comprising a first fabric sheet and a second fabric sheet that overlap.

2. The fiber architecture of claim 1 wherein the first fabric sheet and the second fabric sheet overlap by at least 24 times a thickness of the fabric.

3. The fiber architecture of claim 1 wherein the exterior fabric layer further comprises a third fabric sheet and a fourth fabric sheet that overlap.

4. The fiber architecture of claim 3 wherein the third fabric sheet and the fourth fabric sheet overlap by at least 24 times a thickness of the fabric.

5. The fiber architecture of claim 3 wherein the overlap between the first and second fabric sheets is displaced by about ninety degrees from the overlap between the third and fourth fabric sheets.

6. The fiber architecture of claim 1 further comprising a surfacing veil adjacent the outside of the exterior fabric layer.

7. The fiber architecture of claim 1 further comprising a second layer of circumferential longitudinal rovings extending around the beam adjacent the inside of the interior fabric layer, and a third fabric layer extending around the beam adjacent the inside of the second layer of circumferential rovings.

8. The fiber architecture of claim 1 wherein the rovings and fabric comprise fiberglass.

9. The utility pole of claim 8 wherein the interior fabric layer further comprises a first fabric sheet and a second fabric sheet that overlap.

10. The utility pole of claim 9 wherein the first fabric sheet and the second fabric sheet overlap by at least 24 times a thickness of the fabric.

11. The utility pole of claim 9 wherein the exterior fabric layer further comprises a third fabric sheet and a fourth fabric sheet that overlap.

12. The utility pole of claim 11 wherein the third fabric sheet and the fourth fabric sheet overlap by at least 24 times a thickness of the fabric.

13. The utility pole of claim 11 wherein the overlap between the first and second fabric sheets is displaced by about ninety degrees from the overlap between the third and fourth fabric sheets.

14. A utility pole comprising:
   a fiber architecture in the form of an elongate beam having a hollow polygonal cross section with a plurality of substantially flat sides and a corner between each pair of adjacent sides, the fiber architecture including
   an interior fabric layer extending around the beam, the interior fabric layer further comprising a first fabric sheet and a second fabric sheet that overlap,
   a layer of circumferential longitudinal rovings extending around the beam adjacent the outside of the interior fabric layer, and
   an exterior fabric layer extending around the beam adjacent the outside of the circumferential rovings; and,
   resin impregnating the fiber architecture to bind filaments together to produce a composite utility pole.

15. The utility pole of claim 14 wherein the first fabric sheet and the second fabric sheet overlap by at least 24 times a thickness of the fabric.

16. The utility pole of claim 14 wherein the exterior fabric layer further comprises a third fabric sheet and a fourth fabric sheet that overlap.

17. The utility pole of claim 16 wherein the third fabric sheet and the fourth fabric sheet overlap by at least 24 times a thickness of the fabric.

18. The utility pole of claim 16 wherein the overlap between the first and second fabric sheets is displaced by about ninety degrees from the overlap between the third and fourth fabric sheets.

19. The utility pole of claim 14 further comprising a surfacing veil adjacent the outside of the exterior fabric layer.

20. The utility pole of claim 14 further comprising a second layer of circumferential longitudinal rovings extending around the beam adjacent the inside of the interior fabric layer, and a third fabric layer extending around the beam adjacent the inside of the second layer of circumferential rovings.

21. The utility pole of claim 14 wherein the rovings and fabric comprise fiberglass.

22. A fiber architecture for an elongated beam, comprising:
   (a) a hollow substantially polygonal interior fabric layer;
   (b) a circumferential layer of longitudinal rovings extending around the interior fabric layer, said longitudinal rovings further extending to form circumferential corners corresponding to a polygonal cross-section of the elongated beam; and
   (c) an exterior fabric layer extending around the layer of longitudinal rovings.

23. The fiber architecture of claim 22 further comprising a surfacing veil adjacent the outside of the exterior fabric layer.

24. The fiber architecture of claim 22 further comprising a second layer of circumferential longitudinal rovings extending around the beam adjacent the inside of the interior fabric layer, and a third fabric layer extending around the beam adjacent the inside of the second layer of circumferential rovings.

25. The fiber architecture of claim 22 wherein the rovings and fabric comprise fiberglass.

26. The fiber architecture of claim 22 wherein the interior fabric layer further comprises a first fabric sheet and a second fabric sheet that overlap.

27. The fiber architecture of claim 26 wherein the first fabric sheet and the second fabric sheet overlap by at least 24 times a thickness of fabric.

28. The fiber architecture of claim 26 wherein the exterior fabric layer further comprises a third fabric sheet and a fourth fabric sheet that overlap.

29. The fiber architecture of claim 28 wherein the third fabric sheet and the fourth fabric sheet overlap by at least 24 times a thickness of the fabric.

30. The fiber architecture of claim 28 wherein the overlap between the first and second fabric sheets is displaced by about ninety degrees from the overlap between the third and fourth fabric sheets.

31. A fiber architecture for an elongated beam, comprising:
   (a) a hollow substantially polygonal interior fabric layer;
   (b) a circumferential layer of longitudinal rovings extending around the interior fabric layer, said longitudinal rovings further extending to form circumferential corners corresponding to a polygonal cross-section of the elongated beam;
   (c) an exterior fabric layer extending around the layer of longitudinal rovings; and
   (d) resin impregnating the fiber architecture to bind filaments together to produce a composite utility pole.

32. The utility pole of claim 31 wherein the fabric architecture further comprises a surfacing veil adjacent the outside of the exterior fabric layer.

33. The utility pole of claim 31 wherein the fabric architecture further comprises a second layer of circumferential longitudinal rovings extending around the beam adjacent the inside of the interior fabric layer, and a third fabric layer extending around the beam adjacent the inside of the second layer of circumferential rovings.

34. The utility pole of claim 31 wherein the rovings and fabric comprise fiberglass.

* * * * *